3,062,754
1,1-DIHALO-2,2-DIALKYL CYCLOPROPANE POLYMER
David W. Young and Robert R. Chambers, Homewood, and Eileen M. Paré, Park Forest, Ill., assignors to Sinclair Refining Company, New York, N.Y., a corporation of Maine
No Drawing. Filed Sept. 3, 1958, Ser. No. 758,655
6 Claims. (Cl. 260—2)

This invention concerns a polymer of 1,1-dihalo-2,2-dialkylcyclopropane. The polymer is useful as a hardness agent in elastomers, giving these materials properties comparable to those imparted to them by carbon black but without as much darkening of the product. The novel polymer of this invention is blendable with high molecular weight polyisobutylene, butyl rubber, neoprene, chlorinated rubber, etc., and with most acrylonitrile-styrene polymers. The monomer has the general formula:

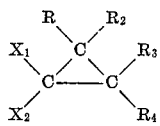

where $X_1$ and $X_2$ are chlorine or bromine, R and $R_2$ are alkyl groups having 1-4 carbon atoms and $R_3$ and $R_4$ are hydrogens or alkyls having 1-4 carbon atoms.

A monomer, for instance 1,1-dichloro-2,2-dimethylcyclopropane may be prepared by the reaction at $-10°$ C. of isobutylene with chloroform in a diluent or solvent comprising t-butyl alcohol and potassium t-butoxide, as described in J. Am. Chem. Soc. 76, 6163 and 6164 (1954). The monomer separates out from this reaction mixture in the chloroform layer from which it may be recovered by evaporation of the chloroform. Another useful monomer is 1,1-dichloro-2,2,3-trimethylcyclopropane.

The polymerization is advantageously conducted at a temperature of at least about $-10°$ F., and usually not above about 125° F. Lower temperatures favor production of longer chain polymers, so that ambient temperature is the preferred upper limit. When polymerization is conducted at a temperature of say 200° F. the polymer is considered to be of "paint resin" grade.

The polymerization is conducted in the presence of a catalyst, preferably solid, active or promoted $AlCl_3$ or other strong metal type Friedel-Crafts catalysts. If desired, the catalyst can be used in non-complexed form as a solution in $C_2H_5Cl$, $CH_3Cl$, or mixtures of alkyl halides with hydrocarbons. Other catalysts, particularly those containing chlorine such as $TiCl_4$ and $TiOCl_2$ and mixed halides such as $Al_2ClBr_5$ may be used, although the latter catalyst is preferably mixed with a substantial amount of $Al_2Cl_5Br$ to obtain the proper catalytic effect. Less active Friedel-Crafts catalysts such as $AlBr_3$ do not seem to be effective for polymerization in the preferred temperature ranges.

The monomer does not polymerize in the solid state, but it can be reacted above its melting point (e.g. $-10°$ C. in the case of 1,1-dihalo-2,2-dimethylcyclopropane). Above or below this temperature the 1,1-dihalo-2,2-dialkylcyclopropane can be polymerized in solution in methyl chloride, ethyl chloride, hexane, propane, etc., or any other solvent which does not enter into the polymerization or side reactions under the reaction conditions.

The halogens in the 1,1-dihalo-2,2-dialkylcyclo-propane feedstock may be chlorine or bromine or a combination of both. Thus the halogens have an atomic number of from 17 to 35. The polymeric 1,1-dihalo-2,2-dialkylcyclopropane appears as a dark-colored precipitate in the reaction mixture. The polymer may be separated from the catalyst and unreacted starting material by filtration and washing with a solvent for the monomeric 1,1-dihalo-2,2-dialkylcyclopropane, such as isopropyl alcohol.

A polymer prepared from 1,1-dichloro-2,2-dimethylcyclopropane has a very high melting point, above 300° C. The ease with which the polymer may be extruded, combined with its high melting point and tensile strength, low-cost, dyability and insolubility in water or common drycleaning solvents makes it useful as a textile fiber. Polymeric 1,1-dichloro-2,2-dimethylcyclopropane for example, has a tensile strength of 2.7 gms./denier compared to a strength of 1.5 gms./denier for acetate fibers and 2.4 gms./denier for viscose fibers.

The mechanism by which polymerization takes place is not completely known. The reaction causes liberation of hydrogen halide. Apparently opening of the ring takes place, with the formation of a straight-chain polymer having $CH_3$ branches at every third carbon of the chain. The following example is to be considered illustrative only and not limiting.

A 10 g. sample of 1,1-dimethyl-2,2-dichlorocyclopropane was mixed with 0.1 g. of anhydrous $AlCl_3$ at the temperature of an acetone and Dry Ice mixture. The 1,1-dimethyl-2,2-dichlorocyclopropane solidified at this temperature leaving the $AlCl_3$ as it was. Upon removing from the Dry Ice bath and warming to room temperature over a period of 5-10 minutes, a definite color change from yellow through orange to a red-brown took place. Upon cooling in the Dry Ice and acetone bath a purple compound was formed as a precipitate along the sides of the reaction vessel. After completion of the reaction the black precipitate formed was washed with isopropyl alcohol giving a brown precipitate and a dark filtrate. Analysis of the precipitate was as follows:

M. pt. ----------------- +300° C.
Percent ash ----------- 0.788.
Percent C ------------- 75.36.
Percent H ------------- 7.90.
Percent Cl ------------ 11.5.
Percent Al ------------ Trace.
Emission spec. -------- Traces of Al, Cu, Si, and Mg.

The polymer was practically insoluble in benzene.

The filtrate from the precipitate was washed with water and then solvated in ether. The ether solution was dried over anhydrous magnesium sulfate and distilled to give approximately two grams of material boiling at 114° C., the boiling point of the starting material, 1,1-dimethyl-2,2-dichlorocyclopropane.

We claim:
1. A method of homopolymerizing 1,1-dihalo-2,2-di-lower-alkyl cyclopropane in which the halogen has an atomic number from 17 to 35 which comprises contacting an $AlCl_3$ catalyst and the liquid monomer to effect polymerization.

2. The method of claim 1 in which the alkyl has 1–4 carbon atoms.

3. The method of claim 1 in which contacting is performed at a temperature of about −10 to 200° F.

4. The method of claim 1 in which the monomer is 1,1-dichloro-2,2-dimethyl cyclopropane.

5. A method of homopolymerizing 1,1-dichloro-2,2-di-lower alkyl cyclopropane monomer which comprises contacting $AlCl_3$ and the liquid monomer until polymerization is substantially complete.

6. A methyl-branched straight chain solid homopolymer of 1,1-dichloro - 2,2 - dimethyl cyclopropane containing about 75.36% carbon, 7.9% hydrogen and 11.5% chlorine, melting above 300° C. and being insoluble in benzene.

References Cited in the file of this patent
UNITED STATES PATENTS 2,933,544    Doering et al. _____ Apr. 19, 1960

OTHER REFERENCES

Pines et al.: Journal American Chemical Society, vol. 75, pages 2315–17 (1953).

Ivin: Journal Chemical Society (London), pages 2241–53 (1956).